(12) United States Patent
Falcon et al.

(10) Patent No.: US 7,587,317 B2
(45) Date of Patent: Sep. 8, 2009

(54) WORD TRAINING INTERFACE

(75) Inventors: Stephen Russell Falcon, Woodinville, WA (US); Clement Chun Pong Yip, Bellevue, WA (US); David Michael Miller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 10/076,825

(22) Filed: Feb. 15, 2002

(65) Prior Publication Data

US 2003/0158731 A1    Aug. 21, 2003

(51) Int. Cl.
*G10L 15/00* (2006.01)
(52) U.S. Cl. .................. 704/231; 256/256.2; 256/256.3
(58) Field of Classification Search ................ 704/231, 704/270, 275, 257, 270.1, 256, 256.2, 3
See application file for complete search history.

(56) References Cited

U.S. PATENT DOCUMENTS

| | | | |
|---|---|---|---|
| 5,001,697 A | | 3/1991 | Torres |
| 5,748,974 A | | 5/1998 | Johnson |
| 5,796,401 A | | 8/1998 | Winer et al. |
| 5,797,123 A | * | 8/1998 | Chou et al. ............... 704/256.5 |
| 5,838,969 A | | 11/1998 | Jacklin et al. |
| 5,842,165 A | * | 11/1998 | Raman et al. ................ 704/255 |
| 5,854,629 A | | 12/1998 | Redpath |
| 5,930,752 A | | 7/1999 | Kawaguchi et al. |
| 6,058,366 A | * | 5/2000 | Tarkiainen et al. ........... 704/270 |
| 6,061,653 A | * | 5/2000 | Fisher et al. .............. 704/256.5 |
| 6,065,041 A | | 5/2000 | Lum et al. |
| 6,125,347 A | | 9/2000 | Cote et al. |
| 6,192,339 B1 | | 2/2001 | Cox |
| 6,233,559 B1 | | 5/2001 | Balakrishnan |
| 6,310,629 B1 | * | 10/2001 | Muthusamy et al. ......... 715/727 |
| 6,434,529 B1 | * | 8/2002 | Walker et al. ................ 704/275 |
| 6,456,974 B1 | * | 9/2002 | Baker et al. .............. 704/270.1 |
| 6,463,413 B1 | * | 10/2002 | Applebaum et al. ....... 704/256.2 |
| 6,469,711 B2 | | 10/2002 | Foreman et al. |
| 6,507,817 B1 | | 1/2003 | Wolfe et al. |
| 6,662,163 B1 | * | 12/2003 | Albayrak et al. ............ 704/275 |
| 6,785,654 B2 | * | 8/2004 | Cyr et al. .................. 704/270.1 |
| 6,975,993 B1 | * | 12/2005 | Keiller ........................ 704/275 |
| 7,013,467 B1 | | 3/2006 | McLain, Jr. et al. |
| 7,139,713 B2 | | 11/2006 | Falcon et al. |
| 7,143,039 B1 | | 11/2006 | Stifelman et al. |
| 7,188,066 B2 | | 3/2007 | Falcon et al. |
| 7,299,185 B2 | | 11/2007 | Falcon et al. |
| 2002/0024539 A1 | | 2/2002 | Eleftheriadis et al. |
| 2002/0095290 A1 | * | 7/2002 | Kahn et al. .................. 704/260 |
| 2003/0050777 A1 | * | 3/2003 | Walker, Jr. .................. 704/235 |

OTHER PUBLICATIONS

Sun Microsystems. "Java Speech API Programmer's Guide". Version 1.0. Oct. 26, 1998.*
Sun Microsystems. "Java Speech API Specifications". Version 1.0. 1997-1998.*

(Continued)

*Primary Examiner*—Qi Han
(74) *Attorney, Agent, or Firm*—Lee & Hayes, PLLC

(57) ABSTRACT

A method for exposing speech engine features to one or more independent applications wherein the features relate to word training and/or wherein the method optionally exposes the speech engine features without invoking a user interface. A word training interface to expose speech engine features to one or more independent applications wherein the interface is optionally an application programming interface.

20 Claims, 7 Drawing Sheets

OTHER PUBLICATIONS

"Skin (computing)". http://en.wikipedia.org/wiki/Skin_%28computing%29. Wikipedia entry.

"Winamp 3 Preview". http://www.mp3newswire.net/stories/2001/winamp3.htm. May 23, 2001.

"Winamp.com Skins". http://www.winamp.com/skins. (Various selections).

"Winamp2: Winamp's Subwindows". http://www.winamp-faq.de/english/wa2/documentation/sub.htm. 2000 DigiTalk.

* cited by examiner

INTERACTION A
200

INTERACTION B
220

INTERACTION C
230

EXEMPLARY WORD TRAINING PROCEDURE

WORD TRAINING INTERFACE

TECHNICAL FIELD

Exemplary systems and methods described herein relate to speech recognition systems. More particularly, the described systems and methods relate to a word training interface.

BACKGROUND

Speech recognition systems have been incorporated into many useful applications so that users may utilize the applications without having to manually operate an input device, such as a mouse or a keyboard. Personal computer systems (desktop, laptop, handheld, etc.) and automobile systems are only two examples of systems, or platforms, which may include integrated speech recognition functions.

A single platform may have several applications executing at a given time. For example, in an automobile computer system that utilizes speech recognition software, there may be speech recognition applications for radio operation, navigational tools, climate controls, mail, etc. Personal computers may include word processors, spreadsheets, databases and/or other programs that utilize speech recognition. Each speech recognition application has a grammar associated with it that is a set of commands that the application is attempting to detect at any one time.

As the number of speech recognition applications and grammars has increased, it has become increasingly problematic to run multiple speech recognition application a single platform. When a speech recognition system receives such a command, it must be able to determine which application the speaker directed the command to and which application should respond to the user. Similarly, a speech recognition system should be able to handle training interactions between multiple applications and at least one speech recognition engine. For example, if a word in one application requires training, a system should allow for training of that word and optionally association of that word with a particular grammar or grammars. If so desired, such a system should also allow for training in a "user interfaceless" fashion, i.e., without requiring an application to implement an additional user interface and/or to alter an existing user interface.

SUMMARY

A method for exposing speech engine features to one or more independent applications wherein the features optionally relate to word training and/or wherein the method optionally exposes the speech engine features without invoking a user interface. A word training interface to expose speech engine features to one or more independent applications wherein the interface is optionally an application programming interface.

The methods, interfaces and/or systems optionally operate to a train word without having to invoke a user interface that is not associated with the application. Thus, such methods, interfaces, and/or systems allow an application to control user experiences. Such methods, interfaces, and/or systems are optionally suitable for use in environments having a plurality of independent user applications and one or more speech engines. According to various exemplary methods, interfaces, and/or systems described herein, a speech server and/or a speech application programming interface are also implemented. Further, as described below, a word training interface optionally includes a word trainer API.

BRIEF DESCRIPTION OF THE DRAWINGS

A more complete understanding of exemplary methods and arrangements described herein may be had by reference to the following detailed description when taken in conjunction with the accompanying drawings wherein.

DETAILED DESCRIPTION

Figure 1:
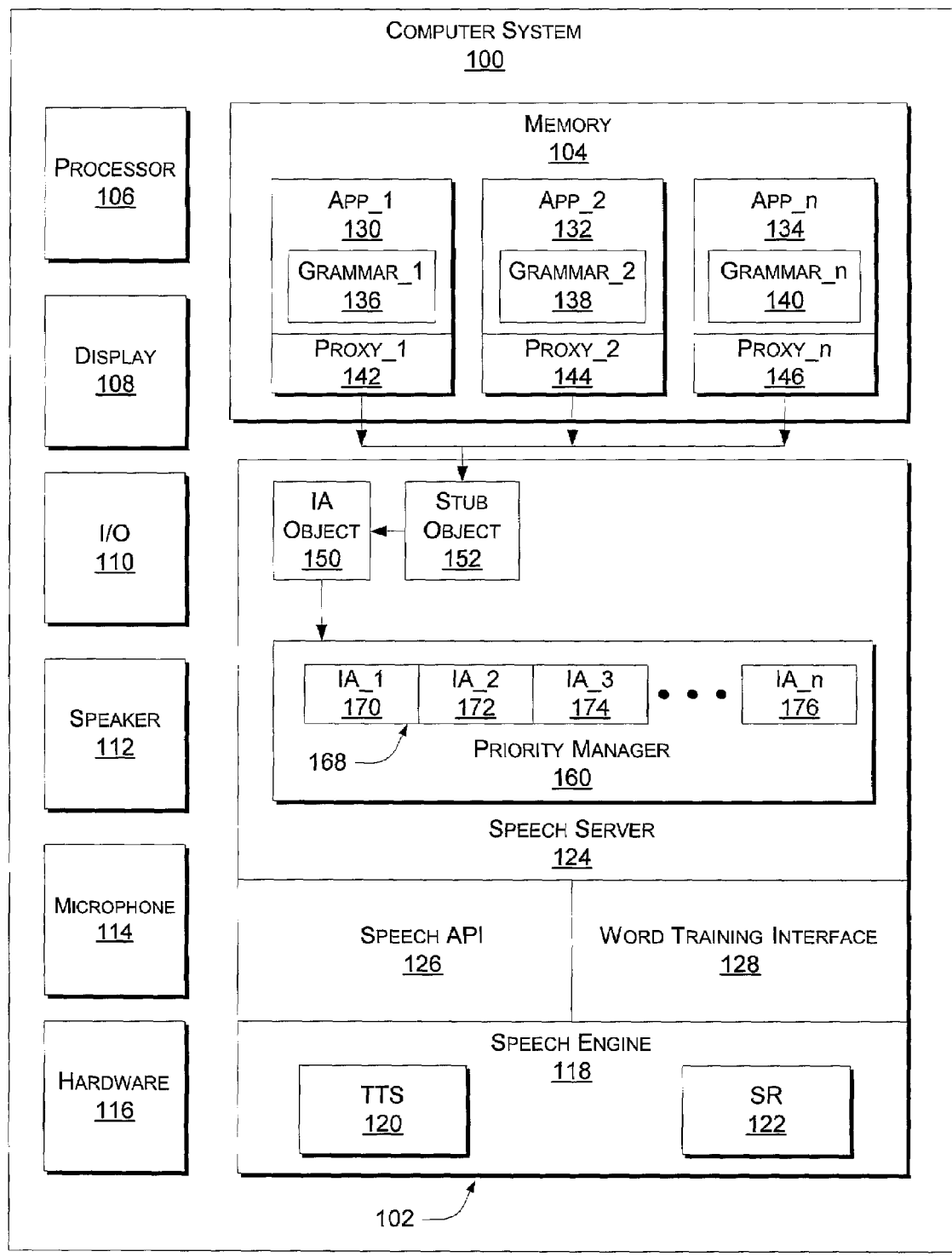
FIG. 1 is a block diagram of an exemplary computer system and/or environment that includes a speech server and a speech application programming interface.

The exemplary methods and/or systems concern training in a speech recognition system that is able to manage interactions from multiple applications that require use of at least one speech recognition engine. As described herein methods include procedures, processes, and/or equivalents thereof. Aspects of various exemplary methods and/or systems are optionally applicable to a variety of speech recognition systems, e.g., discreet, connected, continuous, etc.

Furthermore, exemplary methods and/or systems described herein are optionally implemented as (or in) an automobile speech recognition system or systems. Of course, non-automobile environment implementations are also possible and within the scope of various exemplary methods and/or systems. Reference may be made to one or more of such environments. Those skilled in the art will recognize the multitude of environments in which the exemplary methods and/or systems, and structural and/or functional equivalents thereof, may be implemented.

General Terms

Following is a brief description of some of the terms used herein. Some of the terms are terms of art, while others have a more particular meaning when used to describe various exemplary methods and/or systems. Describing such terms initially helps to provide proper context for the discussion that follows, although the descriptions are not meant to limit the scope of the terms in the event that one or more of the descriptions conflict with how the terms are used in the discussion.

Grammars

As previously stated, each speech recognition application likely has its own specific grammar that a speech recognition system must recognize. There are a variety of different things that applications will want to do with their grammars, such as constructing new grammars, using static grammars, enable/disable rules or entire grammars, persist grammars, make the grammars continually available, etc. The speech recognition system described herein exposes methods to accomplish these things and more.

Different grammars can have different attributes. A static grammar is one that will not change after being loaded and committed. A dynamic grammar, to the contrary, is a grammar that may change after a commit. Whether a grammar is static or dynamic must be known when the grammar is created or registered with the speech recognition system. Rules may also be static or dynamic. A static rule cannot be changed after it is committed, while a dynamic rule may be changed after it is committed. A static rule can include a dynamic rule as a part of the static rule.

A grammar may, at any time, be an enabled grammar or a disabled grammar. A disabled grammar is still within the speech recognition system, but is not being listened for by the system. An enabled grammar may also be called an active grammar; a disabled grammar may also be referred to as an inactive grammar.

Interaction

The term "interaction" is typically used herein to refer to a complete exchange between a speech recognition application and a user. An interaction is a context of communication that unitizes one or more elements of a dialogue exchange. For example, an application developer may want to program a speech recognition application to alert a user with a tone, ask the user a question, and await a response from the user. The developer would likely want these three events to occur sequentially, without interruption from another application in order for the sequence to make sense to the user. In other words, the developer would not want the alert tone sounded and the question asked only to be interrupted at that point with a communication from another application. The user may then not know how or when to respond to the question. Therefore, with the present invention, the developer may include the three actions in one interaction that is submitted to a speech recognition system for sequential execution. Only in special circumstances will an interaction be interrupted. Interactions will be discussed in greater detail below.

Conversation

A series of related interactions may be referred to herein as a "conversation." A conversation is intended to execute with minimal interruptions.

Computer-Executable Instructions/Modules

The exemplary methods and/or systems illustrated in the drawings are typically shown as being implemented in a suitable computing environment. Although not required, various methods and/or systems are described in the general context of computer-executable instructions, such as program modules or blocks, to be executed by a computing device, such as a personal computer or a hand-held computer or electronic device. Generally, program modules or blocks include routines, programs, objects, components, data structures, etc., that perform particular tasks or implement particular abstract data types. Moreover, those skilled in the art will appreciate that various methods and/or systems may be practiced with other computer system configurations, including multi-processor systems, microprocessor-based or programmable consumer electronics, network PCs, minicomputers, mainframe computers, and the like. Various methods and/or systems may also be practiced in distributed computing environments where tasks are performed by remote processing devices that are linked through a communications network. In a distributed computing environment, program modules may be located in both local and remote memory storage devices.

Exemplary Speech Recognition System

FIG. 1 is a block diagram of a computer system 100 that includes an exemplary speech recognition system 102 and memory 104. The computer system 100, as shown in FIG. 1, also includes a processor 106 for executing computer instructions, a display 108, an input/output (I/O) module 110, a speaker 112 for speech output, a microphone 114 for speech input, and miscellaneous hardware 116 typically required in a computer system 100. The computer system 100 may be designed for use in an automobile or in a non-automobile environment, such as in a desktop computer, a handheld computer, an appliance, etc.

The speech recognition system 100 includes a speech engine 118 having a text-to-speech (TTS) converter 120 and a speech recognizer (SR) 122. The TTS converter 120 and the speech recognizer 122 are components typically found in speech recognition systems. The speech recognizer 122 is configured to receive speech input from the microphone 114 and other audio sources, and the TTS converter 120 is configured to receive electronic data and convert the data into recognizable speech that is output, for example, by the speaker 112.

The speech recognition system 102 also includes a speech server 124 that communicates with the speech engine 118 by way of a speech application programming interface (SAPI) 126. The SAPI 126 is a software layer used by the speech applications 130-134 and the speech server 124 to communicate with the speech engine 118. The SAPI 126 controls a number of aspects of the speech recognition system 102, such as: controlling audio input, loading grammar files, sharing recognitions across multiple applications, returning results and other information back to the applications, preventing applications from calling the speech engine 118 with invalid parameters, dealing with applications hanging and crashing, etc.

Although various exemplary methods and/or systems discussed herein may be implemented without the SAPI 126, use of the SAPI 126 can prevent speech server 124 users from having to implement code for each speech engine 118 that may be used in the speech recognition system 102. By implementing the SAPI 126 to separate the speech engine 118 from the speech server 124, the speech server 124 can operate with any number of vendor-specific speech engines.

Also shown in FIG. 1 is a word trainer application programming interface 128 (at times referred to herein as a "word trainer API"). The word trainer API 128 is a software layer used directly and/or indirectly by the speech applications 130-134 and/or the speech server 124 to communicate with the speech engine 118. For example, the speech applications 130-134 and/or the speech server 124 may use the word trainer API 128 indirectly via the SAPI 126 to communicate with the speech engine 118. Various exemplary word training interfaces and/or word trainer APIs are described in more detail below.

Referring again to FIG. 1, a plurality of applications may be stored in the memory 104, including application_1 130, application_2 132 and application_n 134. Depending on the components that make up the computer system 100, virtually any practical number of applications may be stored in the memory 104 for execution on the speech server 124. As shown in FIG. 1, each application 130-134 includes an associated grammar: Application_1 130 includes grammar_1 136; application_2 132 includes grammar_2 138; and application_n utilizes grammar_n 140. In the exemplary system 100, each of the applications 130-134 also includes a proxy that is used to communicate with the speech server 124. Application_1 130 uses proxy_1 142; application_2 132 uses proxy_2 144; and application_n 134 uses proxy_n 146.

As shown in FIG. 1, the speech server 124 includes an interaction object 150 and a stub object 152. The interaction object 150 is utilized to receive interactions from the applications 130-134 for processing. The stub object 152 is called by the applications 130-134, which in turn calls the interaction object 150. The stub object 152 is generally used with the proxies 142-144 to provide fault tolerance for the speech recognition system 102. Although exemplary methods and/or system may be implemented without utilizing proxies and a stub object, use of proxies and a stub object may provide the system 102 with enhanced stability, for example, making it less prone to errors.

In the exemplary system 100 of FIG. 1, the applications 130-134 are configured to call several controls which generally exist in a process space of an application. Controls are typically designed to provide application developers a robust, reliable set of user-interface tools with which to build applications. In general, controls are code modules that perform recurring functions desired by application developers. As such, controls decrease the programming effort required by an original equipment manufacturer or an independent vendor to create a rich application user interface.

For example, a question control gives an application developer an easy way to create various modal, system-initiated interactions, or dialogues. An announcement control provides a developer a simple way to deliver verbal feedback to users, including short notices and long passages of text-to-speech. A command control provides a way for applications to specify what grammar it is interested in listening to, and communicates to the applications if and when a recognition occurs. A word trainer control optionally provides an easy way to implement a speech-oriented work-training interaction with a user.

Speech recognitions systems typically include a vocabulary, for example, an entire set of speech commands recognizable by a speech recognition system (e.g., the speech recognition system 102). A vocabulary is optionally maintained by a SAPI (e.g., SAPI 126) and/or a speech engine (e.g., speech engine 118). Speech recognition systems typically include a master grammar table, which contains information about grammars. In general, a master grammar table does not include actual grammars, but rather it includes information about grammars (e.g., grammars 136, 138, 140).

The speech server 124 of the exemplary system 100 includes a priority manager 160. As shown in FIG. 1, the priority manager 160 maintains a list 168 of one or more interactions (interaction_1 170, interaction_2 172, interaction_3 174, interaction_n 176) from one or more applications in a particular order for processing by the speech server 124. As previously discussed, an interaction is, in one sense, a logical context used by an application to communicate with a user. To avoid conflicts, at any given time, there is generally only one active interaction between the user and an application. Other interactions may exist between internal components of the exemplary system which do not necessarily communicate with a user.

According to the exemplary system 100, the priority manager 160 processes the interactions 170-176 in a priority-based order. In general, interactions can be inserted at the front of the list 168, i.e., before interaction_1 170, or at the end of the list 168. If an interaction (not shown) is inserted at the front of the list 168, an interrupt occurs to interrupt the processing of interaction_1 170. A user interaction (e.g., input) initiated via a user interface, associated with an application (e.g., the applications 130, 132, 134), generally has further effect through subsequent interaction with the SAPI 126 (e.g., calls to the SAPI 126), the word trainer API 128 (e.g., calls to the word trainer API 128), and/or the speech engine 118 (e.g., calls to the speech engine 118). In an exemplary process, an interaction (e.g., interaction 170, 172, 174, or 176) in queue on the speech server 124 does not necessarily have to interact with the SAPI 126 or the word trainer API, for example, it may interact directly with the speech engine 118. However, for word training, an interaction (e.g., interaction 170, 172, 174, or 176) in queue on the speech server 124 generally interacts with the word trainer API 128 because, as described below, the word trainer API 128 (or alternative word training interfaces) provide features, typically functional features, that facilitate and/or enable word training procedures. As described in more detail below, in various exemplary systems, a word training interface may optionally alleviate the need to use a user interface, for example, a user interface associated with a speech engine or even the word training interface. Instead, for example, an application can create its own user interface for word training, wherein that user interface can issue calls to a word training interface (e.g., typically via a speech server when an environment has a plurality of speech recognition applications).

The priority manager 160 is also configured to notify the applications 170 176 of the following exemplary non-limiting transitions so that the applications 170-176 may modify the state or content of an interaction as it is processed in the list 168: interaction activated, interaction interrupted, interaction self-destructed, interaction re-activated, and interaction completed. As a result, the applications 170-176 can be aware of the state of the exemplary speech recognition system 102 at all times.

As previously noted, an interaction contains one or more elements that represent a "turn" of communication. A turn is a single action taken by either the system or the user during an interaction. For example, the system may announce "Fast or scenic route?" during a turn, which is the system's turn. In response, the user may answer "Fast," which is the user's turn.

Exemplary Interactions

Figure 2A:
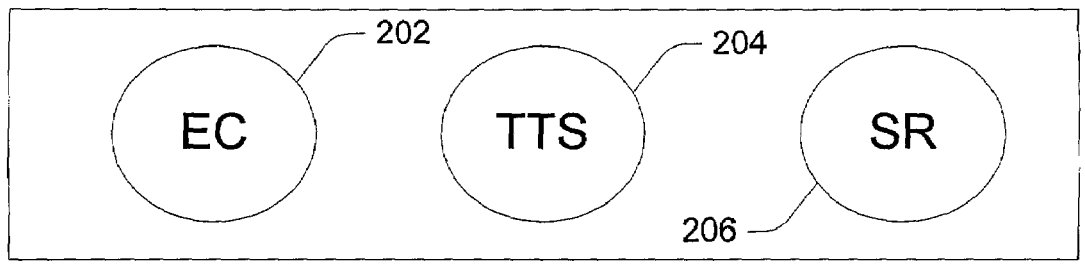
FIG. 2a is a diagram of an exemplary interaction using a system such as that shown in FIG. 1.

FIG. 2 illustrates some exemplary interactions. FIG. 2a depicts exemplary interaction_A 200. Interaction_A 200, when executed, will sound a tone, ask a question and await a response from a user. Interaction_A 200 includes three elements that each represent a turn of communication: the first turn is the tone, the second turn is the question, and the third turn is the waiting. The first element is an EC (earcon) 202, which causes an audio file to be played. In this example, the EC 202 sounds a tone to alert a user that the speech recognition system 102 is about to ask the user a question. The second element is a TTS (text-to-speech) 204 element that plays a text file (i.e., speaks), which in this example, asks the user a question. The last element is an SR (speech recognition) 206 element that listens for a term included in a vocabulary. Processing exemplary interaction_A 200 creates the desired result from the speech recognition system 102.

Figure 2B:
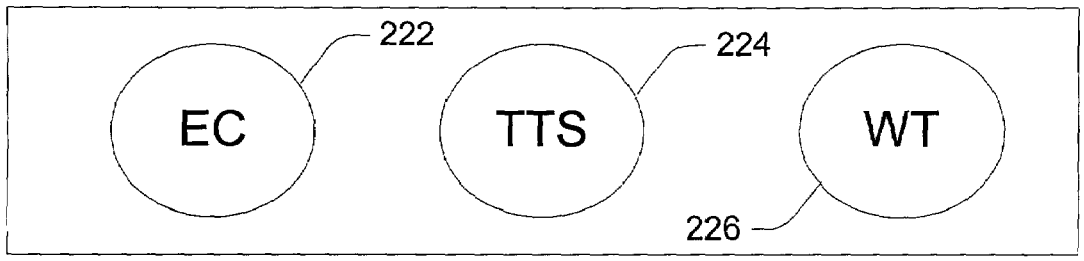
FIG. 2b is a diagram of an exemplary interaction using a system such as that shown in FIG. 1.

FIG. 2b depicts exemplary interaction_B 220 that also includes three elements: an EC 222, a TTS 224 and a WT (word trainer) 226 element. Processing interaction_B 220 results in the speech recognition system sounding a tone, asking the user to state a command, and implementing word training wherein the word training assigns the user's response (or responses) to the command.

Figure 2C:
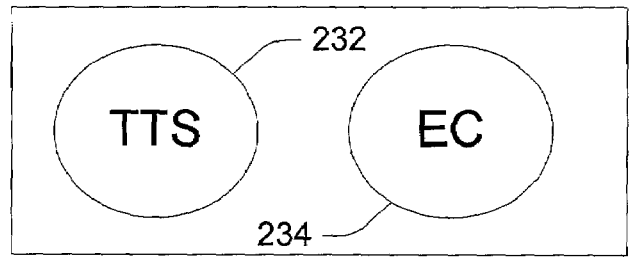
FIG. 2c is a diagram of an exemplary interaction using a system such as that shown in FIG. 1.

FIG. 2c depicts exemplary interaction_C 230 that includes two elements: a TTS 232 and an EC 234. Processing interaction_C 230 results in the speech recognition system 102 playing a text file followed by the playing of an audio file.

There is another type of element (not shown) that may be inserted into an interaction to cause a delay, or time out, before the system processes subsequent elements. This type of element is referred to as a NULL element. A NULL element would be inserted into an interaction to allow additional time for the interaction to be processed.

Referring again to FIG. 1, the priority manager 160 provides for the ordering of interactions, including the elements (EC, TTS, WT, NULL, SR) discussed above. This prevents, for example, more than one application from addressing the user simultaneously. The priority manager 160 processes the interactions 170-176 in the list 168 in the order in which the interactions are submitted to the priority manager 160 (i.e., on a first-in-first-out basis). An exception to this particular process may occur when an application is provided with the ability to submit an interaction directly to the beginning of the list 168, for example, in situations where the application considers the interaction a high priority or when an interaction is a part of a continuing conversation.

Word Training Interface (e.g., a Word Trainer API)

A training procedure generally involves having a user speak a word or a series of words to provide a speech recognition engine with the acoustic data it needs to recognize a grammar word or phrase that it may not have previously contained within its lexicon. As discussed below, a word training interface (e.g., the word trainer API 128 of FIG. 1) optionally operates as an engine extension object.

Note that the exemplary word training interface can function without implementing or invoking a user interface. Thus, an application relying on such a word training interface can access speech engine functionality while retaining control over the user experience. Further, depending on the particular user application, a UI-less word training API has advantages in that an application has control over user experiences. Of course, exemplary word training interfaces described herein are not limited to UI-less word training interfaces.

As already mentioned, an exemplary word training interface does not define user experiences, but rather, allows an application to define user experiences. Consider a notification to a user that lets the user know when to commence speaking. This notification is optionally through use of an EC that executes prior to a call to a word training interface feature or method for commencing recording (e.g., see StartRecording below). In an alternative, an application may cause a flashing button or other object to appear on a user interface to notify a user as to when to commence speaking. This notification may appear prior to a call to a word training interface feature or method for commencing recording (e.g., see StartRecording below). Thus, various exemplary word training interfaces allow for development of a variety of applications having any of a variety of user experiences.

Figure 3:
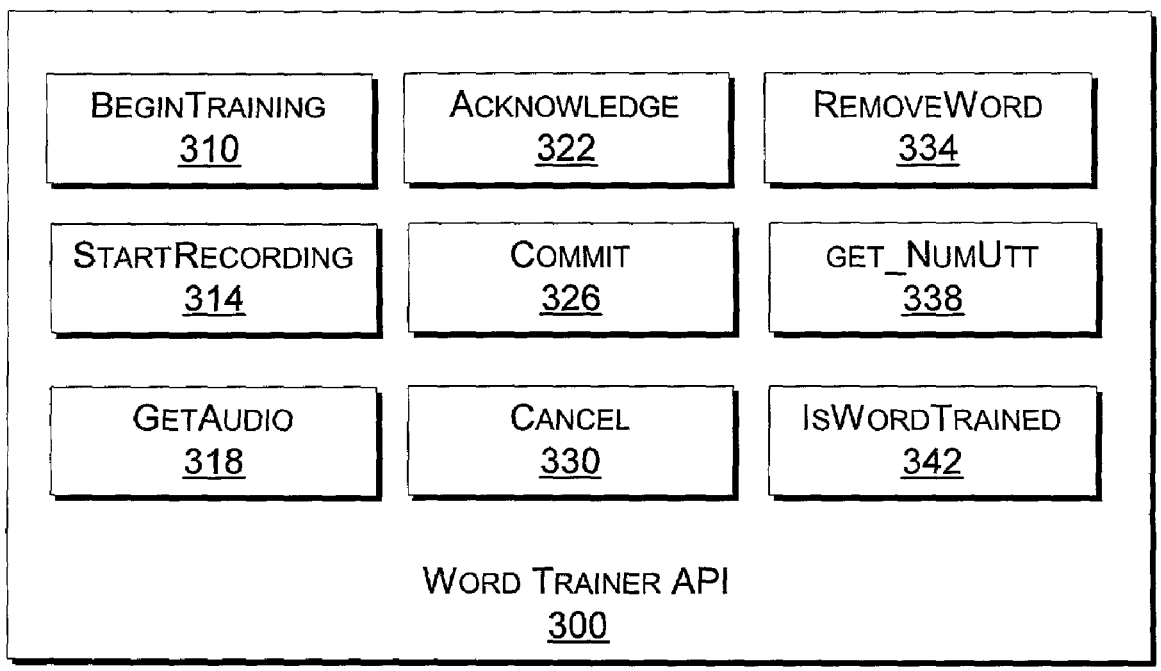
FIG. 3 is a block diagram of an exemplary word training interface.

Referring to FIG. 3, a block diagram of an exemplary word trainer API 300 is shown. The exemplary word trainer API 300 operates as a word training interface and shares various features with the word trainer API 128 as described with reference to FIG. 1. As described above, this exemplary word trainer API 300 is optionally implemented as an SAPI engine extension interface. As shown in FIG. 3, the word trainer API 300 includes the following exemplary features as methods or blocks: a BeginTraining block 310, a StartRecording block 314, a GetAudio block 318, an Acknowledge block 322, a Commit block 326, a Cancel block 330, a RemoveWord block 334, a get_numUtt block 338, and a IsWordTrained block 342. These methods optionally include one or more parameters. The word trainer API 300 can optionally parse a call to retrieve such parameters and/or pass such parameters to a speech engine, a speech server, an application, a SAPI, etc.

The BeginTraining block 310 can initiate a training process and optionally indicate which string requires training. For example, a call to an exemplary BeginTraining block 310 can include a string as a parameter. Upon receipt of the call, the word trainer API 300 can then parse the call to retrieve the string. The word trainer API 300 may then pass the string as desired. The BeginTraining block 310 may also initiate loading and/or activation of an appropriate word training grammar. According to the exemplary word trainer API 300, a string may be an item in the lexicon (e.g., "mom") and/or an item to be treated more as a token (e.g., "RadioPresetl" for an automotive radio having a plurality of preset radio stations). In the instance that the string is an item in the lexicon, then word training generally results in replacement of the lexicon item. In the instance that the item is not in the lexicon, then word training generally results in addition of a new lexicon item. Of course, other alternative treatments are possible depending on the needs of the particular user application and/or features of the speech recognition engine.

In general, calls to the BeginTraining block 310 are processed one at a time. A call to the Commit block 326 and/or Cancel block 330 typically terminates a word training procedure initiated by the BeginTraining block 310. Thus, only after one word training procedure terminates can a call to the BeginTraining block 310 initiate another word training procedure. The BeginTraining block 310 may also strictly limit the scope of speech recognition to the precise item being trained.

The StartRecording block 314 can initiate a recording process upon a trigger, such as, but not limited to, sensed user speech (e.g., detectable audio). In general, the StartRecording block 314 returns a status message that indicates the quality of the recording process and/or the recording. For example, a parameter may include a status message that optionally indicates a time out (e.g., no trigger after a set time period), an error, a good quality recording, and/or a poor quality recording. Of course, the StartRecording block 314 may form part of a loop to allow an opportunity or opportunities to enhance quality (e.g., optionally dictated by the speech recognition engine); however, after a set time period, a global timeout typically occurs. Alternatively, another process or thread may interrupt execution of the StartRecording block 314 (e.g., through a call to the Cancel block 330).

The GetAudio block 318 retrieves and/or saves audio data; a word training procedure typically calls the GetAudio block 318 after execution of the StartRecording block 314, for example, after the StartRecording block 314 obtains a recording. The GetAudio block 318 optionally includes a parameter to indicate whether to save or discard (e.g., overwrite) a recording, which is optionally set upon execution of another block (e.g., a block executed prior to a call to the StartRecording block 314).

A word training procedure calls the Acknowledge block 322 to acknowledge and/or accept a recording. The Acknowledge block 322 optionally includes a parameter to indicate whether the speech recognition engine should save or discard (e.g., overwrite) a recording and a parameter to indicate whether training of the particular word was adequate, for example, wherein further recordings are unwarranted for a particular word training procedure. In general, a word training procedure holds audio data on a temporary basis only, for example, during the period between a call to the StartRecording block 314 and a call to the Acknowledge block 322. If storage of such data is desirable, the GetAudio block 318 and/or other blocks may save audio data and/or other information related to a word training procedure. Determinations of whether to save audio data are optionally made during execution of a word training procedure in, for example, the StartRecording block 314 and/or other blocks.

The Commit block 326 commits the result of a word training procedure. In general, a call to the Commit block 326 completes a word training procedure. In addition, execution of the Commit block 326 can release all resources from training and/or discard information pertaining to prior related trainings.

A call to the Cancel block 330 can interrupt execution of any block (potentially including blocks not listed in FIG. 3). Upon execution, the Cancel block 330 typically returns a speech recognition engine to a state equivalent to its state prior to initiation of the current word training procedure (e.g., prior to a call to the BeginTraining block 310).

The RemoveWord block 334 removes a training result (or other result) for a specified string (e.g., wherein the string corresponds to a word lexicon item and/or a word token item). Upon execution the get_NumUtt block 338 provides the number of utterances needed to train any particular word. If a speech recognition engine does not track such information a call to the get_NumUtt block 338 returns a null or other suitable value. Execution of the IsWordTrained block 342 typically returns a Boolean value that indicates whether a particular string is trained.

Exemplary Word Training Procedure

Figure 4:
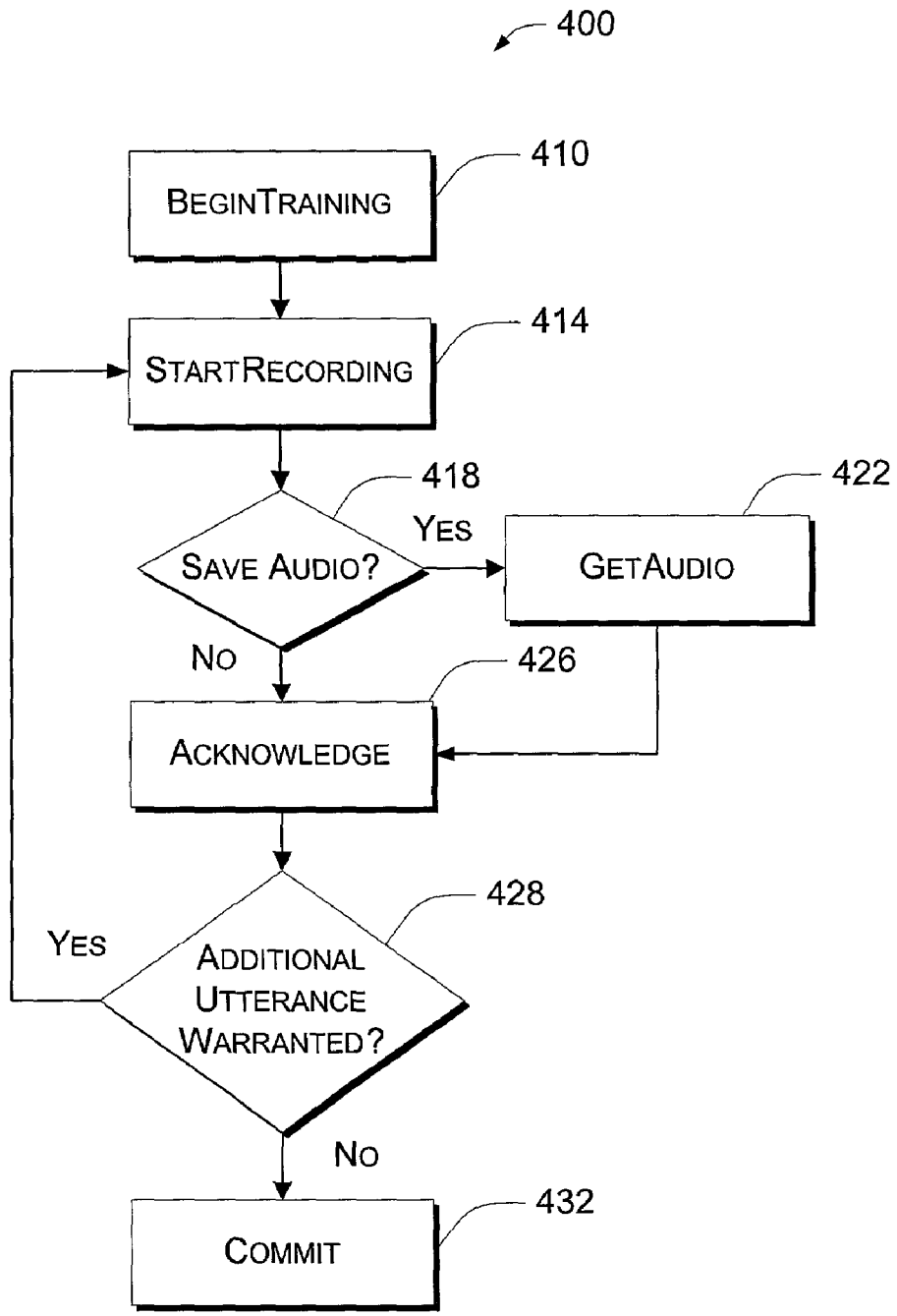
FIG. 4 is a flow block diagram depicting a methodological implementation of an exemplary word training procedure.

Referring to FIG. 4, a block diagram of an exemplary word training procedure 400 is shown. This exemplary word training procedure 400 is implemented as a word training interface, for example, as a word trainer API such as, but not limited to, the word trainer API 128 of FIG. 1 and/or the word trainer API 300 of FIG. 3. In general, the various functional blocks of FIG. 4 share features with the blocks 310-342 described with reference to FIG. 3.

As shown in FIG. 4, the exemplary word training procedure 400 commences with a call to a BeginTraining block 410 for initiating training wherein the call contains a string wherein the string corresponds to an item in the lexicon. Following the BeginTraining block 410, a call to a StartRecording block 414 occurs. According to the exemplary procedure 400, a user speaks during execution of the StartRecording block 414 to allow for acquisition of audio data. Once the user has finished speaking, the StartRecording block 414 returns. Next, a decision block 418 determines whether to preserve the audio data that was acquired during execution of the StartRecording block 414. This decision block 418 is optionally included within another block, such as, but not limited to, the StartRecording block 414. If the decision block 418 determines that the audio data should be preserved, a call to a GetAudio block 422 follows wherein execution of the GetAudio block 422 saves the audio data. If the decision block 418 determines that the audio data should not be preserved, then a call to an Acknowledge block 426 follows. A call to the Acknowledge block 426 also follows the GetAudio block 422.

Execution of the Acknowledge block 426 acknowledges the recording (e.g., acquisition of audio data). Another decision block 428 follows acknowledgement of the recording wherein a determination occurs as to whether additional utterances (or recordings) are warranted. For example, a particular speech recognition engine may require a plurality of recordings to get a representative sampling of how a user says a word or a phrase, or to verify a training result. Of course, the number of utterances is optionally provided in an earlier block, for example, the BeginTraining block 410 wherein the number of recordings is known a priori. According to the exemplary procedure 400, one of the blocks optionally calls a get_NumUtt block (e.g., the get_NumUtt block 338 of FIG. 3) to get the number of recordings required by the speech recognition engine; the procedure 400 can then use this number to loop between the StartRecording block 414 and the decision block 428 until acquisition of a final recording. The decision block 428 is optionally part of or called during execution of the Acknowledge block 428. As such, a system relying on a plurality of utterances may start with a call to a BeginTraining block 410 and then loop through the StartRecording block 414 and the Acknowledge block 426. As shown in FIG. 4, following the decision block 428 (e.g., a final recording or utterance), a call to a Commit block 432 occurs. The Commit block 432 commits the speech recognition training performed during the exemplary word training procedure 400. In general, execution of the Commit block 432 completes the exemplary word training procedure 400.

A word training interface may also cause a speech recognition engine to disable grammars during a training procedure. For example, upon a call to a BeginTraining block, no recognitions occur until a call to a Commit block or a Cancel block occurs. Further, according to an exemplary word training interface executing an exemplary word training procedure, blocks such as an IsWordTrained block and a RemoveWord block are callable at any point, except between a call to a BeginTraining block and a Commit block or a Cancel block.

According to various exemplary training procedures, a call to a Commit block replaces any prior occurrence or training of a word with the result of the training procedure. In this manner, execution of such a training procedure acts to replace rather than to enhance a lexical item. For example, if the word "mother" is trained to "mama", in all cases where "mother" was accepted, the only alternative should be "mama", which is applied across grammars.

Exemplary Application-Interface-Engine Arrangements

While the various exemplary word training procedures and word training interfaces described above include particular features, other exemplary procedures and/or interfaces may include other and/or additional features. In general, a word training interface includes a plurality of features to allow an application developer to adequately include word training procedure options within an application that depends, at least in part, on speech recognition. Such word training interface features are typically callable methods and/or other functional elements that relate to speech recognition and, in particular, word training. In essence, a word training interface can expose speech engine features (e.g., speech engine functionalities) either directly or indirectly to a plurality of applications. To do so, a word training interface generally includes a plurality of features to allow for exploitation of speech engine capabilities. In addition, a word training interface may optionally include features for use with one or more speech engines. In general, a judicious selection of features can ensure that a word training interface will provide adequate flexibility in a computing environment that relies on speech recognition.

Figure 5:
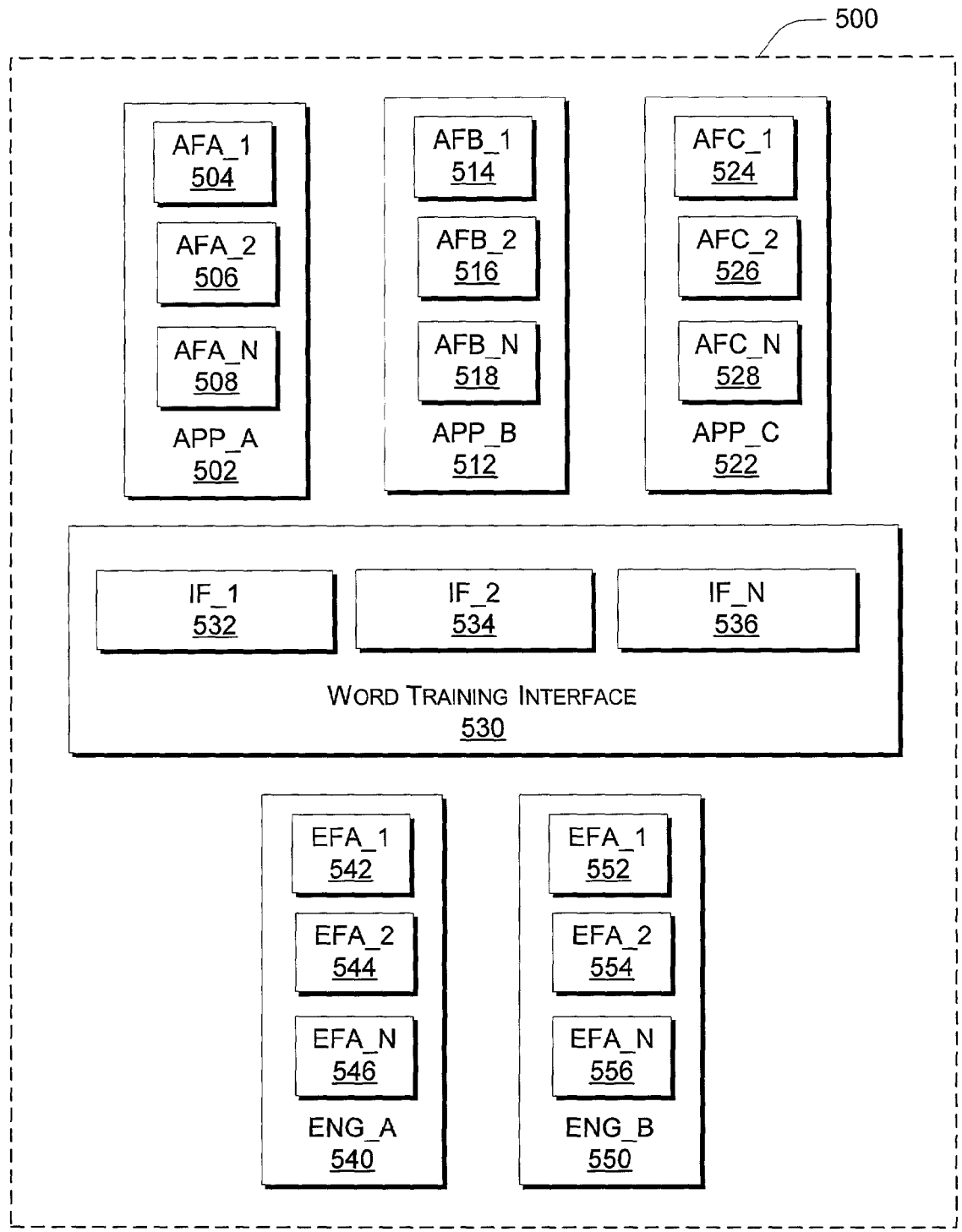
FIG. 5 is a block diagram of an exemplary word training interface in an exemplary computing environment.

Referring to FIG. 5, an exemplary word training interface 530 is shown within an exemplary computing environment 500. As shown in FIG. 5, the computing environment 500 includes applications APP_A 502, APP_B 512 and APP_C 522, a word training interface 530 and speech engines ENG_A 540 and ENG_B 550. According to this exemplary environment 500, instructions issues by the applications APP_A 502, APP_B 512 and APP_C 522, the word training interface 530 and/or the speech engines ENG_A 540 and ENG_B 550 are optionally receivable directly and/or indirectly by these and/or other elements of the computing environment 500. Note that while not shown, the computing environment 500 optionally includes software, hardware and/or other items shown in the computer system 100 of FIG. 1. For example, the applications 502, 512, 522, optionally operate in conjunction with a speech server (e.g., the speech server 124) and/or a speech API (e.g., the speech API 126). As such, instructions issued from the applications APP_A 502, APP_B 512 and APP_C 522, the word training interface 530 and/or the speech engines ENG_A 540 and ENG_B 550 are optionally receivable by a speech server and/or a speech API.

As shown in FIG. 5, each of the applications 502, 512, 522 includes features which are optionally related to word training. For example, the application 502 includes application features 1 (AFA_1 504) through N (AFA_N 508), where "N" represents any integer number, which may be unique for the application APP_A 502. Likewise, the application 512 includes application features 1 (AFB_1 514) through N (AFB_N 518) where "N" represents any integer number, which may be unique for application APP_B 512, and the application 522 includes application features 1 (AFC_1 524) through N (AFC_N 528) where "N" represents any integer number, which may be unique for application APP_C 522. In general, the features are related to word training for applications that offer speech recognition and/or text-to-speech options.

The word training interface 530, which is optionally a word trainer API, includes features 1 (IF_1 532) through N (IF_N 536), where "N" represents any integer number, which may be unique for the word training interface 530. The features IF_1 532, IF_2 534, IF_N 536 optionally include features represented in the functional blocks of FIG. 3. In general, the features are useful for implementing word training in applications that offer speech recognition and/or text-to-speech options.

The computing environment 500 also includes two speech engines: ENG_A 540 and ENG_B 550. Each of these engines 540, 550, includes a variety of features which are optionally useful for word training. For example, the engine ENG_A 540 includes features 1 (EFA_1 542) through N (EFA_N 546), where "N" represents any integer number, which may be unique for the engine ENG_A 540, and the ENG_B 550 includes features 1 (EFB_1 552) through N (EFB_N 556), where "N" represents any integer number, which may be unique for the engine ENG_B 550. In general, the features are useful for implementing word training in applications that offer speech recognition and/or text-to-speech options.

According to the exemplary computing environment 500, the word training interface 530 allows for implementation of features of the applications 502, 512, 522 through use of features of at least one of the speech engines 540, 550 (e.g., functionality related to word training procedures). Hence, the word training interface 530 allows an application to execute features related to a word training procedure or procedures. Of course, the exemplary computing environment 500 may optionally rely on more than one word training interface to effectively achieve similar functionality.

Additional Exemplary Word Training Procedure

Figure 6:
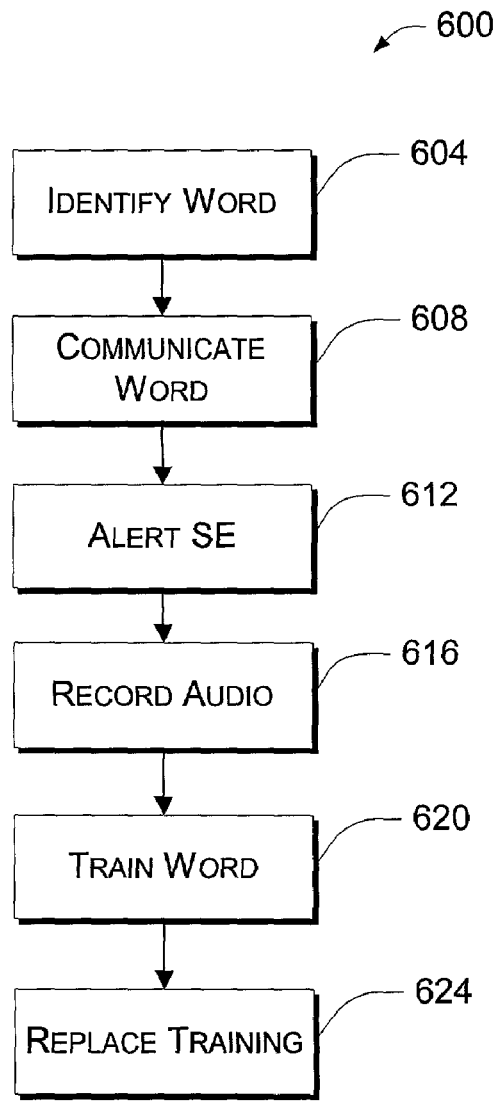
FIG. 6 is a flow block diagram depicting a methodological implementation of an exemplary word training procedure.

Referring to FIG. 6, a block diagram of an exemplary word training procedure 600 is shown. This exemplary procedure 600 is suitable for use with the exemplary word training interface 530 and/or computing environment 500 shown in FIG. 5. In an identification block 604, an application (e.g., the applications 502, 512, 522 of FIG. 5) identifies a word that needs training. Next, in a communication block 608, the application communicates the word, typically as a parameter (e.g., string parameter), directly and/or indirectly to a word training interface (e.g., the word training interface 530 of FIG. 5). An alert block 612 follows wherein the word training interface implements an alert feature to alert a speech engine that training and/or recording is requested. For example, consider the BeginTraining block 310 of the word trainer API 300 shown in FIG. 3.

Referring again to FIG. 6, in a record block 616, the speech engine implements a record feature to acquire audio data associated with the identified word. For example, a record feature that corresponds to the StartRecording block 314 of the word trainer API 300 shown in FIG. 3. According to the exemplary procedure 600, a train block 620 follows the record block 616, wherein the speech engine implements a training feature to train the identified word on the basis of the acquired audio data to thereby produce a training, which is typically a new training for the identified word. Finally, in a replacement block 624, a replacement feature replaces any prior training associated with the identified word with the new training. Of course, the exemplary procedure may also include quality check blocks, a speech server block, a prioritization block, a speech application programming interface block, and/or other functional blocks. Such blocks optionally aid in exposing speech engine features to a plurality of independent applications (e.g., see applications 502, 512, 522 of FIG. 5, which are optionally independent applications).

In another exemplary procedure, a speech engine optionally uses a default phonetic parsing rather than, for example, an existing training. In such an exemplary procedure, the "new training" replaces the default information or adds more specific information about how to recognize the trained word. Overall, default information and/or a prior training may be considered old information; a new training typically replaces and/or supercedes the old information.

Exemplary Computer Environment

Figure 7:
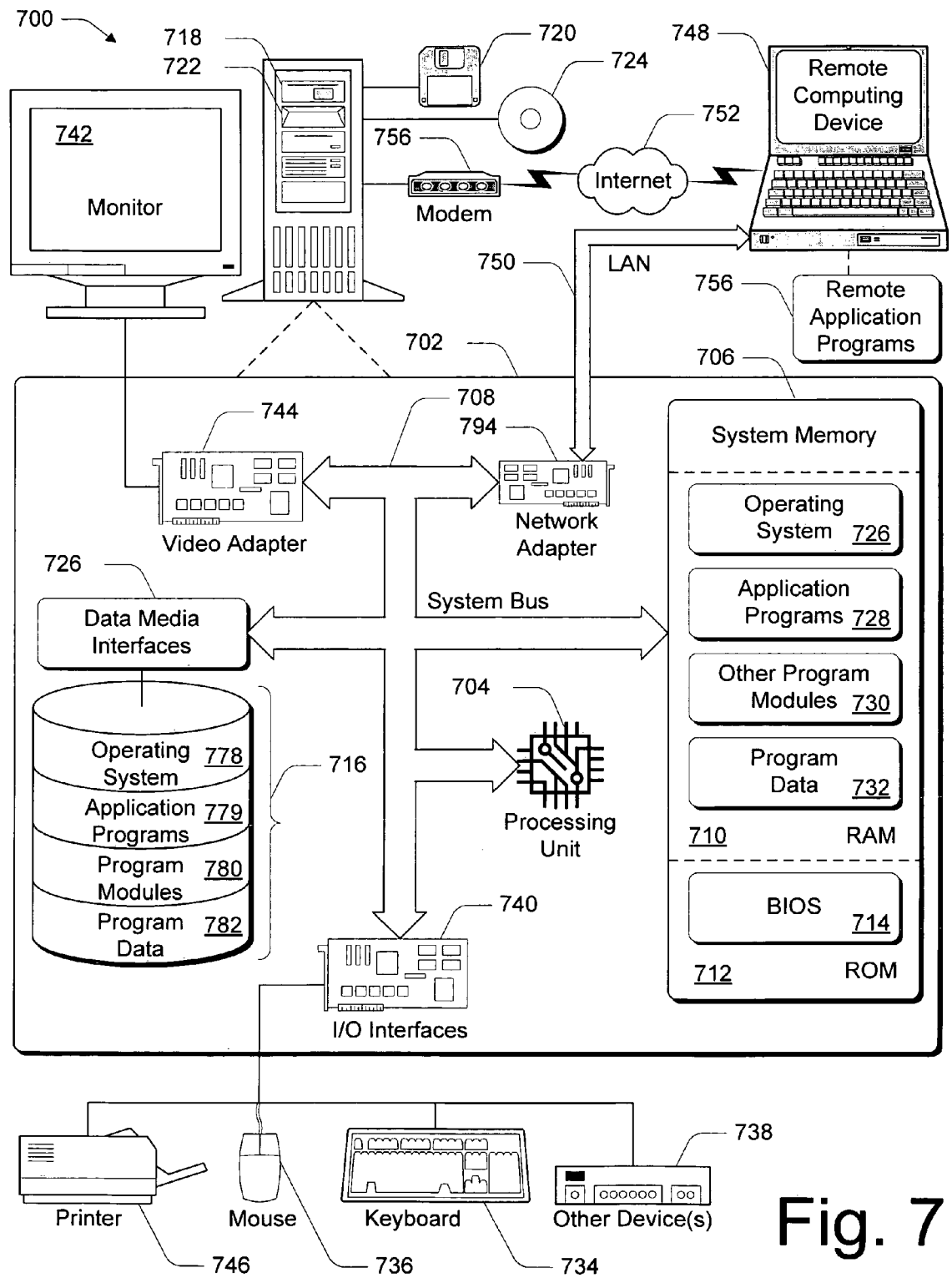
FIG. 7 is a diagram of an exemplary computing environment within which the various exemplary methods, interfaces, systems, etc. may be implemented.

The various exemplary methods and/or systems described herein, including associated components and/or functionality, are implemented with any of a number of individual computers. FIG. 7 shows components of typical example of such a computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 702 may include, but are not limited to, a processing unit 704, a system memory 706, and a system bus 708 that couples various system components including the system memory to the processing unit 706. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer environment 700 typically includes a variety of computer-readable media. Computer-readable media can be any available media that can be accessed by computer 702 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 702. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 712 and random access memory (RAM) 710. A basic input/output system 714 (BIOS), containing the basic routines that help to transfer information between elements within computer 702, such as during start-up, is typically stored in ROM 712. RAM 710 typically contains data and/or program modules that are immediately accessible to and/or presently being operated on by processing unit 704. By way of example, and not limitation, FIG. 7 illustrates operating system 726, application programs 728, other program modules 730, and program data 732.

The computer 702 may also include other removable/non-removable, volatile/nonvolatile computer storage media. By way of example only, FIG. 7 illustrates a hard disk drive 716 that reads from or writes to non-removable, nonvolatile magnetic media, a magnetic disk drive 718 that reads from or writes to a removable, nonvolatile magnetic disk 720, and an optical disk drive 722 that reads from or writes to a removable, nonvolatile optical disk 724 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 716 is typically connected to the system bus 708 through a non-removable memory interface such as interface 726, and magnetic disk drive 718 and optical disk drive 722 are typically connected to the system bus 708 by a removable memory interface.

The drives and their associated computer storage media discussed above and illustrated in FIG. 7 provide storage of computer-readable instructions, data structures, program modules, and other data for computer 702. In FIG. 7, for example, hard disk drive 716 is illustrated as storing operating system 778, application programs 779, other program modules 780, and program data 782. Note that these components can either be the same as or different from operating system 726, application programs 728, other program modules 730, and program data 732. Operating system 778, application programs 779, other program modules 780, and program data 782 are given different numbers here to illustrate that, at a minimum, they are different copies. A user may enter commands and information into the computer 702 through input devices such as a keyboard 734 and pointing device 736, commonly referred to as a mouse, trackball, or touch pad. Other input devices (not shown) may include a microphone, joystick, game pad, satellite dish, scanner, or the like. These and other input devices are often connected to the processing unit 704 through a user input interface 740 that is coupled to the system bus 708, but may be connected by other interface and bus structures, such as a parallel port, game port, or a universal serial bus (USB). A monitor 742 or other type of display device is also connected to the system bus 708 via an interface, such as a video interface 744. In addition to the monitor, computers may also include other peripheral output devices such as speakers and printer 746, which may be connected through an output peripheral interface 740.

The computer may operate in a networked environment using logical connections to one or more remote computers, such as a remote computer 748. The remote computer 748 may be a personal computer, a server, a router, a network PC, a peer device or other common network node, and typically includes many or all of the elements described above relative to computer 702. The logical connections depicted in FIG. 7 include a local area network (LAN) 750 and a wide area network (WAN) such as the Internet 752, but may also include other networks. Such networking environments are commonplace in offices, enterprise-wide computer networks, intranets, and the Internet 752.

When used in a LAN networking environment, the computer 702 is connected to the LAN 750 through a network interface or adapter 794. When used in a WAN networking environment, the computer 702 typically includes a modem 756 or other means for establishing communications over a WAN, such as the Internet 752. The modem 756, which may be internal or external, may be connected to the system bus 708 via the user input interface 740, or other appropriate mechanism. In a networked environment, program modules depicted relative to the computer 702, or portions thereof, may be stored in the remote memory storage device. By way of example, and not limitation, FIG. 7 illustrates remote application programs 756 as residing on remote computing device 748. It will be appreciated that the network connections shown are exemplary and other means of establishing a communications link between the computers may be used.

Conclusion

Although details of specific exemplary methods, interfaces, and/or systems are described above, such details are intended to satisfy statutory disclosure obligations rather than to limit the scope of the following claims. Thus, the methods, interfaces, and/or systems, etc. as defined by the claims are not limited to the specific features described above.

The invention claimed is:

1. A method implemented by a computing device configured to expose speech engine features via a word training interface, the method comprising:
    exposing, via the interface, speech engine features for one or more speech engines to a plurality of independent applications wherein the speech engine features comprise one or more features for word training to train a word;
    receiving, via the interface, a call issued by one of the plurality of independent applications to train a word using one of the one or more speech engines; and,
    after training the word, receiving, via the interface, a call issued by the one of the plurality of independent applications for adding or replacing information associated with the word in a lexicon associated with at least the one independent applications, the lexicon stored in memory of the computing device and for use during speech recognition.

2. The method of claim 1, wherein the exposing exposes the speech engine features without invoking a user interface to thereby allow each of the plurality of independent applications to control a user's experience of that independent application.

3. The method of claim 1 comprising receiving a call issued by one of the plurality of independent applications, the call having a parameter; parsing the call to retrieve the parameter; and communicating the parameter to one of the one or more speech engines.

4. The method of claim 1 comprising receiving a call from a speech server, the call issued by one of the plurality of independent applications and having a parameter; parsing the call to retrieve the parameter; and communicating the parameter to one or the one or more speech engines.

5. The method of claim 1 comprising receiving a call for a callable method wherein the callable method comprises at least one method selected from the group consisting of a method to begin word training, a method to start audio recording, a method to get audio data, a method to acknowledge a recording, a method to commit a word training, a method to cancel a word training, a method to remove a word, a method to get a number of utterances, and a method to query whether a word is trained.

6. The method of claim 1, wherein the word training interface is an application programming interface.

7. One or more computer-readable storage media having computer-readable instructions thereon which, when executed by a programmable computing device, perform the method of claim 1.

8. An application programming interface for exposing speech engine features for word training to a plurality of independent applications, the interface implemented by a computing device and comprising:
    one or more methods of the interface, stored in the computer device, callable by one of the plurality of independent applications, the one or more callable methods having parameters, and the parameters passable to one or more speech engines wherein the speech engine features comprise one or more features for word training to train a word and, after training a word, adding or replacing information associated with the word in a lexicon associated with at least one of the plurality of independent applications, the lexicon stored in memory of a computing device and for use during speech recognition.

9. A word training interface for exposing speech engine features, implemented by a computing device, the interface comprising:
    one or more callable methods of the interface, stored in the computer device, to train a word using a speech engine and then adding or replacing information associated with the word in a lexicon associated with an application, stored in memory of a computing device and for use during speech recognition wherein the one or more callable methods are callable through instructions issued by at least two applications and wherein the one or more callable methods, when called by an application to train a word, cause at least one communication with at least one of a plurality of speech engines without invoking a user interface.

10. The word training interface of claim 9 comprising an application programming interface.

11. The word training interface of claim 9 wherein the one or more callable methods comprise at least one method selected from the group consisting of a method to begin word training, a method to start audio recording, a method to get audio data, a method to acknowledge a recording, a method to commit a word training that allows for adding or replacing an item in a lexicon associated with an application, a method to cancel a word training, a method to remove a word, a method to get a number of utterances, and a method to query whether a word is trained.

12. A speech recognition system implemented by a computing device, the system comprising:
    user interaction means for allowing a user to initiate interactions from any of a plurality of applications;
    word training interface means for providing methods, the methods callable through the plurality of applications and providing for word training to train a word using a speech engine and, after word training, providing for adding or replacing information associated with the word in a lexicon associated with any of the plurality of applications, the lexicon stored in memory of a computing device and for use during speech recognition; and
    speech engine means for communicating with the word training interface means wherein the speech engine means comprises one or more speech engines.

13. The system of claim 12, further comprising speech server means for prioritizing the interactions from any of the plurality of applications to the word training interface means.

14. The speech recognition system of claim 13, wherein the methods callable through the plurality of applications execute without invoking a user interface to thereby allow each of the plurality of applications to control a user's experience of that application.

15. The system of claim 12, wherein the word training interface means comprises an application programming interface.

16. A method of exposing speech engine features related to word training for one or more speech engines to plurality of independent applications, the method implemented by a computing device and comprising:
- based on an interaction with one of the plurality of independent applications, issuing an instruction to a word training interface having word training interface features that correspond with the speech engine features related to word training wherein receipt of the instruction results in a call to one of the speech engine features to train a word; and
- based on an interaction with the one of the plurality of independent applications, issuing an instruction to the word training interface wherein receipt of the instruction results in a call to one of the speech engine features for adding or replacing information associated with the word in a lexicon associated with at least the one application, the lexicon stored in memory of a computing device and for use during speech recognition.

17. A computing system configured to execute a word training procedure, comprising:
- one or more speech engines;
- a plurality of applications, each of the plurality of applications configured to receive a user instruction through an associated user interface, and to issue an instruction related to training of a word; and
- a word training interface configured to receive an instruction related to training of the word, issue an instruction to one of the one or more speech engines for training of the word, to thereby produce a new training, and to issue an instruction to commit the new training and wherein the instruction to commit the new training allows for adding or replacing information associated with the word in a lexicon associated with at least one of the plurality of applications, the lexicon stored in memory of a computing device and for use during speech recognition.

18. The computing system of claim 17, wherein the word training interface is an application programming interface.

19. The computing system of claim 17, wherein the word training interface comprises callable methods.

20. The computing system of claim 17, wherein the word training interface is configured as an engine extension.

* * * * *